United States Patent
Misch

[15] 3,656,843
[45] Apr. 18, 1972

[54] FILM MATCHING APPARATUS

[72] Inventor: Michael Misch, East Mount Airy Road, Croton on Hudson, N.Y. 10520

[22] Filed: Nov. 17, 1970

[21] Appl. No.: 90,386

[52] U.S. Cl. ............................352/129, 352/166, 352/172
[51] Int. Cl. ................................................G03b 21/00
[58] Field of Search..................352/129, 166, 170, 171, 172, 352/85, 87, 59, 60, 133

[56] References Cited

UNITED STATES PATENTS

| | | | |
|---|---|---|---|
| 1,921,469 | 8/1933 | Kuhn et al. | 352/129 |
| 3,002,703 | 10/1961 | Hinchman | 352/129 UX |
| 3,476,470 | 11/1969 | Dejoux | 352/129 X |

Primary Examiner—John M. Horan
Assistant Examiner—Alan A. Mathews
Attorney—Ostrolenk, Faber, Gerb & Soffen

[57] ABSTRACT

Apparatus for matching motion picture film is constructed with individual transport means for the edited work film, the original film, and black leader film. Clutches are operable to couple selected ones of the transport means for coordinated movement of two or three of the film strips as required. Magnified images of selected portions of the films appear at a viewing station, which also contains footage and edge number counters for the work and original films, respectively.

When a desired scene is being taken from the camera original, an equal length of black leader film is also cut. Both are fed to a holding container that is constructed with spiral guide grooves to coil these films, with adjacent coils being spaced from each other.

7 Claims, 11 Drawing Figures

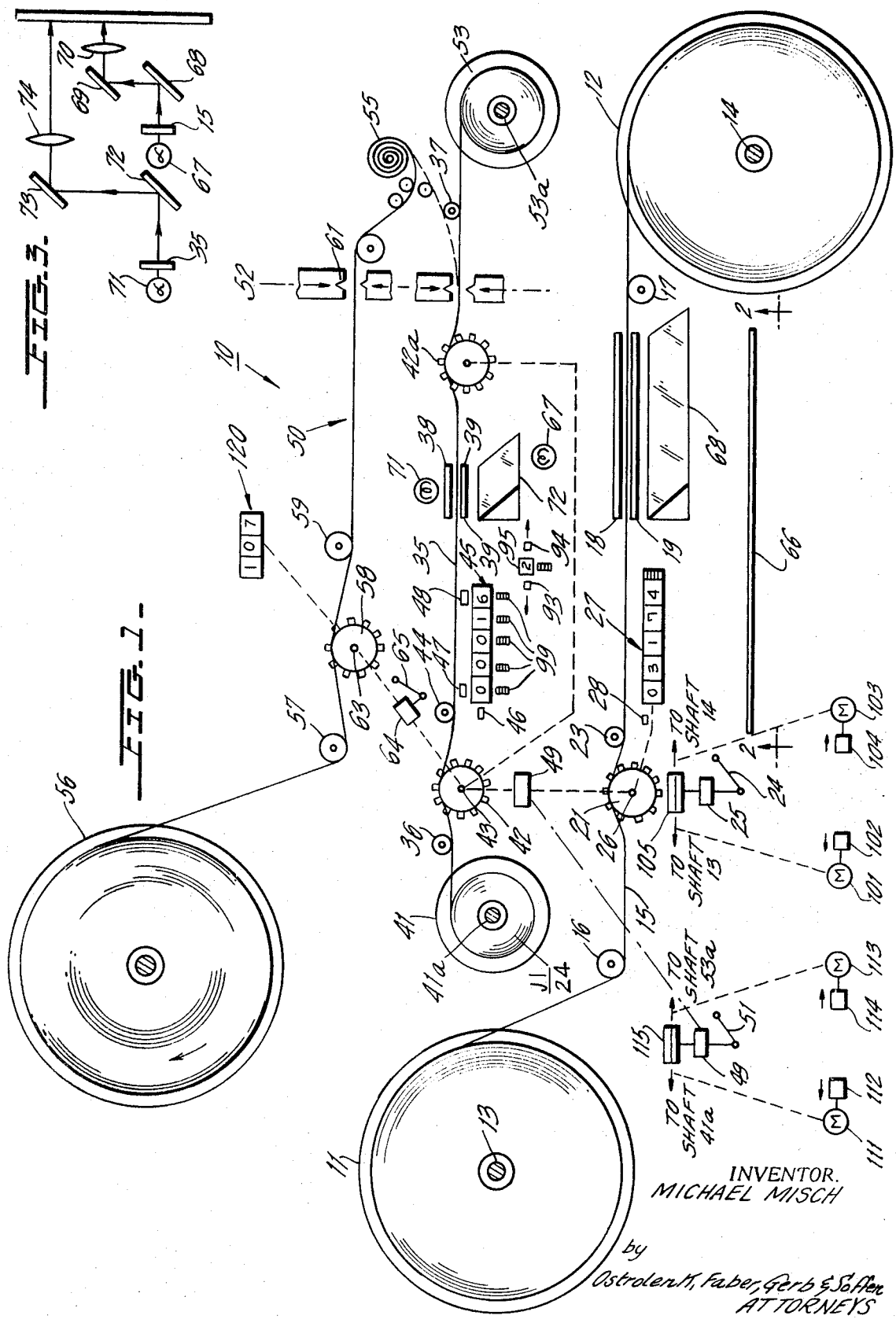

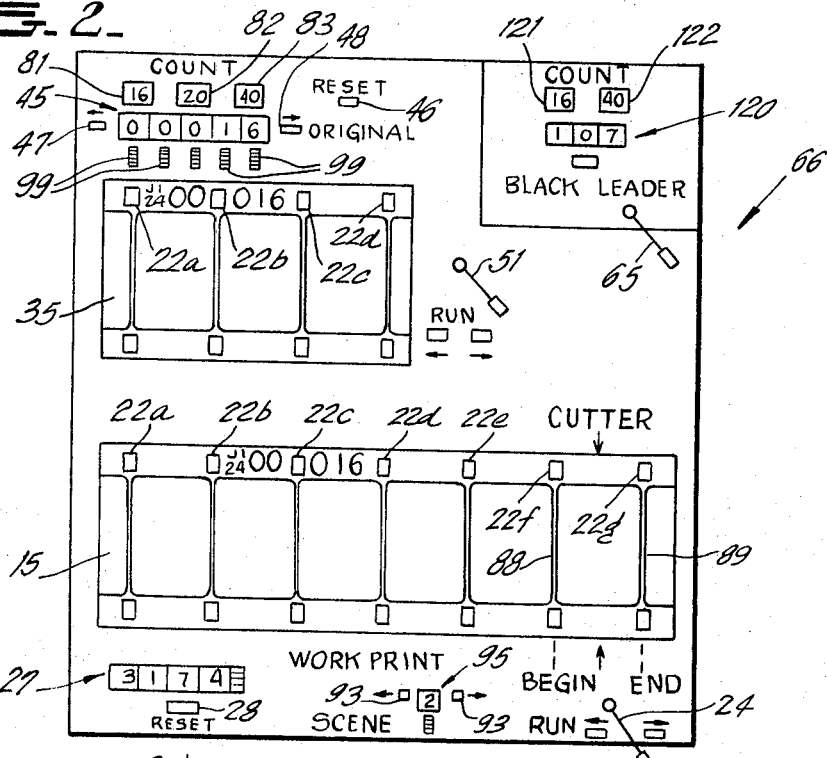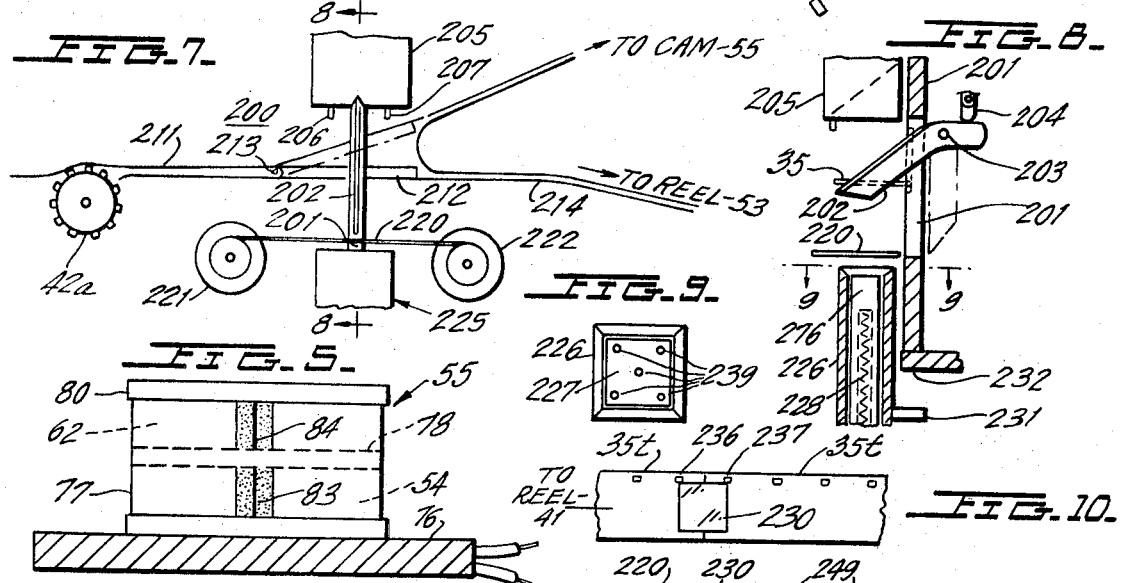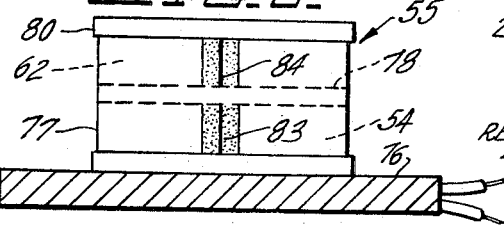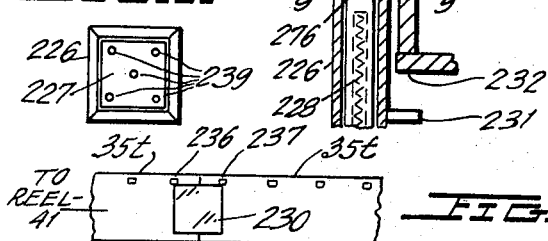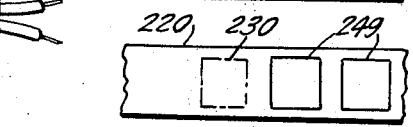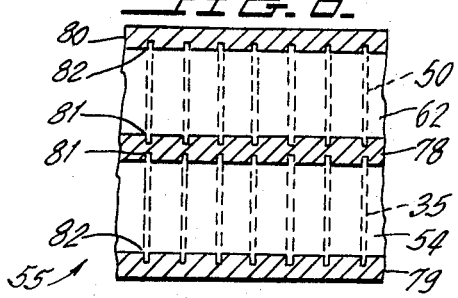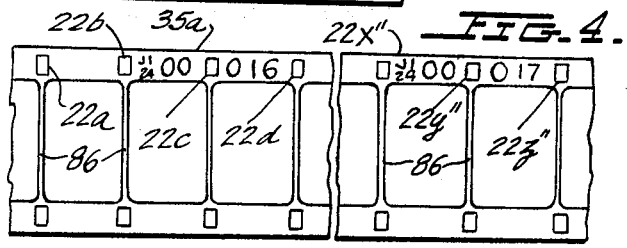

FILM MATCHING APPARATUS

In the production of motion pictures, because of retakes, faulty exposure, etc., footage far in excess of the required footage making up the finish film is shot and the excess film is eliminated during an editing process. Typically, the ratio of film shot to film used for the finished motion picture is from 3:1 to 10:1 and at times is much higher. Scenes taken in random sequence are edited in proper sequence, so that the finished film contains a coherent presentation.

Not only are the individual scenes of original film shot in random sequence, but many rolls of camera original film are used and on any given roll the scene sequence differs from the sequence in the finished film. Thus, the job of film editing requires extensive film handling, with the editor being required to examine and re-examine all of the footage shot.

Editing is carried on with so-called dailies or rushes, which are duplicate copies of the camera original films. From these dailies or rushes the editor assembles a work print. After editing of the work print has been completed, a matching process takes place during which all scenes of the dailies or rushes used to compose the edited work print are matched to identical portions of original film. It is generally accepted practice when working with 16 mm film to connect the selected portions or scenes of original film together to form two rolls of film (so-called A and B rolls), each containing alternate scenes of the edited film, spaced by a so-called black leader. That is, the black leader connecting scenes 3 and 5 on one roll is the length of scene 4 on the other roll. The two rolls of original film with scenes connected by black leaders are printed in apparatus well known to the art to produce a single film.

Heretofore, film matching operations have been carried out by hand. The film matcher or negative matcher is able to identify the particular scenes of the camera original with corresponding scenes of the edited work print by means of edge numbers or marginal codes imprinted on the original film by the manufacturer and reproduced in the laboratory on the work film when the picture information is placed thereon. Such indicia include code marking (such as J1/24 00016) to identify a particular film roll and location thereon. These code markings are spaced apart by 16, 20 or 40 frames depending upon the manufacture raw stock. Typically, 16 mm film is available in roll lengths of 100, 400, 800 and 1,000 feet, and is provided with one sprocket hole per frame, with each foot containing 40 frames.

The instant invention is concerned with apparatus which eliminates a considerable portion of manual film handling required by prior art techniques, and otherwise speeds up the film matching operation.

Briefly, apparatus in accordance with the instant invention provide independent means for transporting the edited work film, the original film, and black leader. Clutch means are provided to selectively operate two or three of the transport means in unison, with those transport means being operated in unison delivering equal lengths of film. The transport means for the work film and the transport means for the original film are tied to individual counters. The counter for the original film roll provides a running record of the edge or code numbers on the original film roll that are visible at its viewing station. Those portions of the work and original films which are viewable at the viewing station are placed adjacent one another to facilitate alignment. When the so-called A and B rolls previously described are to be made up, optionally a double compartmented container may be used to receive a selected scene from the original film and at the same time receive an identical length of black leader. Opposed walls in each compartment are provided with aligned spiral grooves which receive the edges of the film and guide the film into coiled form without causing the film layers to rub against one another. Each of these containers is marked with the number of the particular scene contained therein, and is stored on a rack until the time when the scene sequences are spliced together.

Accordingly, a primary object of the instant invention is to provide novel apparatus for film matching to produce a finished motion picture film.

Another object is to provide apparatus of this type which reduces the time required for film matching, and substantially reduces the likelihood that the original film will be damaged.

Still another object is to provide apparatus of this type, in which there is a viewing station at which the original and work films may readily be viewed, thereby facilitating matching of scenes in the original film with scenes on the edited work film.

These objects as well as other objects of this invention will become readily apparent after reading the following description of the accompanying drawings in which:

FIG. 1 is a plan view, in schematic form, of apparatus constructed in accordance with teachings of the instant invention.

FIG. 2 is a side elevation of the viewing station, looking in the direction of arrows 2—2 of FIG. 1.

FIG. 3 is a schematic of the mirror and lens system for obtaining magnified projections at the viewing station of FIG. 2.

FIG. 4 is a fragmentary plan view of a length of film.

FIG. 5 is a side elevation of a double compartment holding container for receiving and storing a scene length of original film and a corresponding length of black leader.

FIG. 6 is an enlarged fragmentary cross-section of the container of FIG. 5.

FIG. 7 is a plan view of automatic splicing apparatus which may be incorporated in the film matching apparatus of FIG. 1.

FIG. 8 is a cross-section taken through line 8—8 of FIG. 7, looking in the direction of arrows 8—8.

FIG. 9 is an end view of the ram-cutter, looking in the direction of arrows 9—9 of FIG. 8.

FIG. 10 is an elevation view of film having a splice applied thereto by the apparatus of FIGS. 7-9.

FIG. 11 is an elevation view showing a fragmentary section of the tape after the splicing piece of FIG. 10 is cut therefrom.

Now referring to the figures. Film matching apparatus 10 of FIG. 1 includes reels 11, 12, keyed to shafts 13, 14 respectively. Edited work film or print 15 travels between reels 11, 12 in a path defined by idler rolls 16, 23, 17 and cooperating apertured linear guides 18, 19, as well as sprocket 21, whose teeth enter film sprocket holes 22a, 22b, 22c etc. (FIG. 4). Appropriate take-up means, well known to the art, act on shafts 13, 14 to prevent sagging of work film 15 in the region between reels 11, 12. The torques exerted by the take-up means acting on shafts 13, 14 are insufficient to rotate sprocket shaft 26.

Motor 101, operated by push-button control 102, drives shaft 13 counterclockwise and motor 103, operated by push-button control 104, drives shaft 14 clockwise. Hand crank 24 is selectively operable through transfer means or clutch 25 to drive twin ratchet unit 105. The driving output of unit 105 is determined by the direction of rotation of crank 24, so that with clutch 25 energized clockwise rotation of crank 24 rotates shaft 14 clockwise and drives work film 15 to the right. Similarly, with clutch 25 energized counterclockwise rotation of crank 24 rotates shaft 13 counterclockwise and drives work film 15 to the left.

Movement of work film 15 rotates sprocket 21 and shaft 26. Rotation of shaft 26 mechanically drives footage counter 27, which is provided with appropriate means, actuable by button 28, to zero set counter 27 without repositioning sprocket shaft 26. Register 95, having up and down count buttons 93, 94, is used to keep track of scene numbers.

The transport means for moving camera original film 35 in either direction along its feed path defined by idler rolls 36, 44, 37 and cooperating spaced apertured linear guides 38, 39 is essentially the same as the transport means for work film 15. In particular, original film 35 is moved between supply reel 41 and takeup reel 53 by motors 111, 113 operated by controls 112, 114, respectively. Motor 111 is effective to operate supply reel shaft 41a counterclockwise and takeup reel shaft 53a clockwise. Movement of film 35 rotates connected sprockets 42 and 42a, the former being keyed to shaft 43 that drives counter 45 having zero set 46, advance 47, and reverse 48 controls, as well as a set of thumb wheels 99 provided to individually set each digit wheel of counter 45.

Counter 45 is also with three "COUNT" control selector buttons 81, 82, 83 to selectively adjust the driving ratio between sprocket shaft 43 and counter 45 in accordance with the edge code on original film 35. That is, the edge number codes are not the same for all film. The most common codes have indications spaced by 16, 20 or 40 frames. By operating the appropriate count selector button 81-83, counter 45 will change one digit each time the code indication changes as original film 35 moves over sprockets 42, 42a.

Hand crank 51 is selectively connectable through transfer means clutch 49 to drive twin ratchet unit 115. With clutch 49 energized clockwise, rotation of crank 51 rotates shaft 53a clockwise to draw film 35 to the right, and counterclockwise rotation of crank 51 rotates shaft 41a counterclockwise to draw film 35 to the left. Clutch 49 selectively connects shaft 43 to shaft 26, so that films 15 and 35 may be moved in unison.

Film cutter 52, located between linear guide 38, 39 and idler 37, is selectively operable, but only after actuation of a safety interlock, to sever original film strip 35. The lead end of the original film 35, after cutting thereof, is guided manually or guided automatically by a power repositionable guide groove (not shown) to one side or the other of idler roll 37. When guided below idler roll 37, film 35 is directed to takeup reel 53, and when directed above idler 37 film 35 is directed to lower compartment 54 of circular holding container 55 (FIGS. 5 and 6).

Opaque or black leader film strip 50 is withdrawn from supply reel 56 below idler roll 57, over transport means drive sprocket 58, below idler roll 59, between the sections of film cutter 61, to upper compartment 62 of holding container 55. Sprocket shaft 63 drives frame counter 120 having drive ratio adjusting controls 121 and 122. Shaft 63 is selectively connected by clutch 64 to hand crank 65 and sprocket shaft 43. For reasons to be hereinafter seen, black leader supply reel 56 is located in a plane below that containing film supply reels 11 and 41.

The portion of work film 15 aligned with the apertured portion of linear guide 18, 19 appears as a magnified image at viewing station 66 (FIG. 2) by virtue of that portion of the illumination and lens system of FIG. 3 consisting of lamp 67, parallel mirrors 68, 69, and magnifying lens 70. Similarly, the portion of original film 35 aligned with the aperture of linear guide 38, 39 is projected to and is magnified at viewing station 66 by virtue of lamp 71, parallel mirrors 72, 73, and magnifying lens 74.

Holding container 55 (FIGS. 5 and 6) is supported and held in position on the upper surface of magnetic chuck 76, so as to remain stationary as portions of original film 35 and black leader 50 are fed therein. In particular, holding container 55 consists of a short cylindrical body 77, divided by central disc partition 78 into lower 54 and upper 62 compartments closed by removable disc-like covers 79, 80. The upper and lower surfaces of partition 78 are provided with spiral grooves 81 that are aligned with identical spiral groove 82 in the inner surfaces of covers 79, 80. The side wall of container 55 is provided with slits 83, 84, located at the outer ends of spiral grooves 81, 82.

Original film strip 35, entering lower compartment 54 through slit 83, is guided toward the center of container 55 along a spiral path defined by grooves 81, 82, and in this manner the layers or coils of film 35 in compartment 54 do not rub against one another nor do they contact one another, so that original camera film 35 will not be scratched. Similarly, black leader 50 enters upper compartment 62 through slit 84 and travels a spiral path, with the turns of the spiral being spaced from one another.

Original film 35 (FIG. 4) is an elongated strip having evenly spaced sprocket holes 22a, 22b, etc. close to film edge 35a. The spaces between adjacent sprocket holes 22a, 22b, etc. is the space between frames of picture information recorded in tandem on film 35. The top and bottom frame boundaries are indicated by transverse lines 86.

For 16 mm film having different indicia groupings each foot, the code J1/24 00016 printed in the film margin between sprocket holes 22a, 22b, etc. and film edge 35a identifies the film roll and the location thereon. That is, the first code portion J1/24, being different for each film roll, identifies the particular roll, and 00016 indicates that sprocket hole 22b is 16 times the number of frames between edge numbers from the lead end of this film strip. The number 00016 is set on counter 45 for original film 35, and thereafter counter 45 gives an instant readout at all locations of film J1/24.

Using the apparatus of the instant invention, film matching takes place in the following manner. Edited work film 15 is run from reel 11 to reel 12 by activating motor drive 103, and during this operation the operator views the magnified image of film 15 at viewing station 66. For the beginning and end of each scene the operator notes the scene number, the identifying indicia of work film 15, and the corresponding reading on counter 27, with the latter having been set initially to a zero position to correspond to the lead edge of work film 15.

These notes concerning scene numbers, counter readings, and original film roll identification are sorted and arranged so that all scenes appearing on a particular original film, say film 35, are arranged in numerical edge code markings. Original film 35 is positioned so that the indication on counter 45 corresponds to the actual location on original film 35. Work film 15 is then positioned so that the beginning of the first scene taken from film roll J1/24 appears at viewing station 66. Original film 35 is advanced until edge number counter 45 indicates the locating code number (00016) appearing on the portion of work film 15 at viewing station 66. When this occurs, the left portion of work film 15 viewed at station 66 corresponds to the portion of original film at viewing station 66.

Clutch 49 is then operated to couple sprocket shafts 26 and 43. Clutch 25 is energized and crank 24 is operated to position the lead edge of the selected frame in alignment with dash line 88 at viewing station 66. This positions cutter 52 exactly one-half frame in advance of the lead edge of the selected scene. In the usual situation a half frame is sufficient for splicing.

Cutter 52 is then operated to sever original film strip 35, and clutch 64 is operated to disconnect crank 65 and couple sprocket shafts 43 and 63. Then crank 24 is operated to move all three film strips 15, 35 and 50 to the right with respect to FIG. 1, with the lead end of the selected scene from original film 35 being guided above idler roll 37 and inserted manually or by a guide groove into slot 83 of holding container 55. At this time, the lead end of black leader 50 is inserted through container slot 84. Crank 24 is operated until the end of the selected scene is aligned with dashed line 89 at viewing station 66. In this position of film 35, cutter 52 is one-half frame beyond or to the left of the end of the selected scene. In the usual situation, aligned cutters 52 and 61 are then operated to sever both original film 35 and black leader 50 to the same lengths. It is noted that for some types of splicing apparatus two additional frames of black leader are required. This added length is meadured by referring to counter 120 and is fed by crank 65, while shafts 43 and 63 are decoupled. The trailing edges of films 35 and 50 are then manually forced into holding container 55. Container 55 is removed from chuck 76, is marked with the number of the particular scene represented by the portion of original film in this particular holding container 55, and is stored.

Clutches 64 and 49 are then operated to decouple sprocket shafts 26, 43 and 63 from one another, and work film 15 is advanced until the leading edge of the next scene to be taken from original film roll J1/24 is aligned with dashed line 88. Then the steps previously recited are repeated.

The portion of original film 35 which tails a selected portion thereof is tapered or spliced to the trailing end of the film on takeup reel 53. This joining or splicing of film may be done manually, semi-automatically, or automatically, using apparatus of the type illustrated in FIGS. 7–9, to be hereinafter described, and, located between sprocket 42a and reel 53.

After all of the scenes or original film roll J1/24 that appear in edited work film 15 have been severed and placed in individual holding containers 55, a new roll of original film is mounted on shaft 41a and is connected to sprockets 42 and 42a.

While a film strip for a scene has been described as being held in an individual container 55, it should be apparent to those skilled in the art that very short scenes need not be placed in a container, but may be identified and stored as unwound strips, in accordance with the present film matching techniques. Also, very long scenes may be placed on a so-called core.

After all desired original film strip sections have been cut, a person skilled in film splicing may prepare the so-called A and B rolls, with the A roll having odd numbered scenes separated by black leader strips corresponding in length to lengths of original film having the even-numbered scenes, and the B roll consisting of even-numbered scenes of original film separated by odd numbered lengths of black leader. It is noted that for some special effects, such as dissolves, the black leader segment is not equal to the length of the corresponding scene segment.

Now referring more particularly to FIGS. 7–9 which show automatic splicing apparatus that may be incorporated in the apparatus of FIG. 1 to join together those portions of original film 35 that are stored on reel 53. It is not uncommon that portions of original film 35 that are discarded initially may be utilized at a later time. The search through the originally discarded film is facilitated if the sections thereof are joined with the sprocket holes thereof properly spaced so as not to interfere with the functioning of sprocket wheels 41 and 53.

In particular, the automatic splicing apparatus of FIGS. 7–9 includes table 200 having slot 202 through which knife 202 is movable to cut film 35. Knife 202 is pivoted at 203 and is operated clockwise with respect to FIG. 8 in a cutting direction by plunger 204 of a solenoid (not shown) which is selectively actuated by the operator. As blade 202 moves clockwise in a cutting stroke, backup block 205 moves into engagement with the rear of film 35 for support thereof while cutting takes place, with film 35 stopped. Protrusions 206, 207 of block 205 enter sprocket holes along the upper edge of film 35 to stabilize the latter against longitudinal movement during the cutting operation.

The lower edge of film 35 travels in narrow guide grooves in the upper surface of table 201. Immediately to the right of sprocket 42a in FIG. 7 is stationary guide groove section 211, which leads to the input end of movable groove section 212. The latter is formed in a section of table 211 that is pivoted at 213, so that groove section 212 is selectively positionable in the lower position shown in the solid line of FIG. 7 or in the raised position shown in phantom. In its lower position, movable groove 212 is aligned with stationary groove section 214, leading to takeup reel 53, and in the upper position thereof movable groove section 212 is aligned with stationary groove section 215 leading to holding can or container 55.

Splicing tape strip 220 is provided with a pressure actuated adhesive coating the surface thereof, confronting the front surface of film 35. Tape 220 extends from supply reel 221 to take-up reel 222, and is operated in steps coordinated with the operation of cutter-ram assembly 225. The latter includes tubular cutter 226, having a rectangular cross-section, and hollow ram 227 closely fitted in the interior of cutter 226. Spring 228 (FIG. 8) operatively connects cutter 226 to ram 227, so that these two elements initially move in unison as a driving force, acting upwardly with respect to FIGS. 7 and 8, is applied to ram 227. After cutter 226 pierces tape strip 220 to remove splicing path 230 therefrom, transverse projection 231, extending from the exterior of cutter 226, engages table stop 232 to arrest movement of cutter 226 while ram 227 continues moving upwardly with respect to FIGS. 7 and 8, driving tape patch 230 into engagement with original film sections 35t, 35t' at the butt-joint between these film sections. At this time block 205 is in engagement with the rear surfaces of film sections 35t, 35t', and projections 206, 207 extend through sprocket holes 236, 237 to assure that these sprocket holes are properly spaced from one another.

While ram-cutter 225 moves upwardly (with respect to FIGS. 7 and 8) in its operating stroke, a low level vacuum is drawn at the interior of ram 227 with such vacuum acting through end apertures 239 in ram 227 to hold splicing piece 230 thereagainst as piece 230 travels from tape strip 200 to placement against film strip portions 35t, 35t'. The aforesaid vacuum is released immediately prior to retraction of ram 227. Tape strip 220 moves one step to the right with respect to FIGS. 7 and 11 each time cutter-ram 225 is operated through a complete cycle and while cutter-ram 225 is in its fully retracted position, shown in FIGS. 7 and 8.

Operation of the apparatus of FIGS. 7 and 8 takes place in the following manner, keeping in mind that all cutting and splicing operations take place while movable guide groove 212 is in its lower position, shown in FIG. 7. Consider that a desired section of film is being fed to holding can 55, under these circumstances movable guide groove 212 is in its raised position of FIG. 7. When movement of the film strip is halted, movable guide groove 212 is operated downward to the solid line position of FIG. 7 and a control (not shown) is actuated to effect a cutting operation, during which knife 202 is pivoted clockwise with respect to FIG. 8 and block 205 is moved to a supporting position at the rear of film 35. At the conclusion of the cutting operation, block 205 is retracted and knife 202 is retracted to a position below table 201.

If the film portion at the left of the cut is to be used to make up the final film, movable groove 212 is moved to its raised or phantom positions of FIG. 7, wherein this film is guided into stationary groove section 215 to a holding container 55.

If a splicing operation is to take place, movable groove section 212 remains in its lowered or solid line position of FIG. 7 and cutter-ram 225 is moved from its lowered position of FIG. 7 forward toward movable groove section 212. Simultaneously, backup block 205 moves in the opposite direction into engagement with the film sections in movable groove 212. As ram-cutter 225 engages and passes through tape 220, cutter 226 cuts rectangular splicing piece 230 from tape 220, leaving a series of windows 249, 249, etc. in the portion of tape 220 that is wound on takeup reel 222. When projections 231, 232 engage, forward movement of cutter 226 is arrested. However, ram 227 continues to move forward, and the vacuum drawn therein holds splicing piece 230 to the forward tip of ram 227 from the time splicing piece 230 is formed until it is applied to original film portion 35t, 35l (FIG. 10). Before ram 227 is moved rearward to its inactive position, the vacuum therein is released, so that the film is not dragged from the guide groove 212–214.

It should now be apparent that the apparatus hereinbefore described reduces the time for film matching, in that counters 27, 45 permit rapid film movement to selected positions without the necessity of attempting to review and identify scenes on fast moving film. Time is also saved by cutting the black leader strips to required length at the same time that scenes are cut from the original film. The enlargement of the identifying indicia of the film reduces the possibility of error, and the utilization of the spiral groove holding container substantially reduces the likelihood of film damage.

While my invention has hereinbefore been described in connection with the manual recording of coded identifying indicia and the manual charting thereof in a usable sequence, it should now be apparent to those skilled in the art that locating scene information contained in the indicating code indicia along the film margin together with scene numbers and work film footage information may be fed to a computer that operates to arrange this information in useful form and is coupled to counters connected to the film advance mechanism to move the various film strips automatically or on command. Feeding of such information to a computer may be accomplished by direct reading devices which scan the indicating indicia, or by having the film matcher operate a keyboard.

Further, while this invention has been described in connection with a single size of film, it should now be apparent that adjustable and/or interchangeable elements may be used to readily set up for handling many different sizes of film, and film having sprocket holes along both edges. In addition, a supply of white leader film may be provided together with the necessary transport and control elements therefor connected for cooperation with the elements illustrated and hereinbefore described.

Although there have been described preferred embodiments of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows.

1. Apparatus for matching sections of an original film with scenes of an edited work film, said apparatus including first transport means for moving the work film through a viewing station, first readout means to indicate the location on the work film that is at the viewing station, second transport means for moving the original film through said viewing station, second readout means to indicate the location on the original film that is at the viewing station, transfer means selectively operable between a first and a second position, said transfer means when in said first position enabling said first and second transport means to be operated independently of one another, said transfer means when in said second position coupling said first and second transport means for simultaneous coordinated operation during which equal lengths of said films move through said viewing station, and a cutting station through which the original film is moved by the second transport means, cutter means at said cutting station selectively operable to cut selected sections from the original films.

2. Apparatus as set forth in claim 1, also including viewing means at said viewing station to facilitate reading of code and locating indicia along the edges of said films.

3. Apparatus as set forth in claim 1, also including a supply of black leader film, third transport means for moving black leader film from said supply and through said cutter means, another transfer means selectively operable between a first and a second position, said another transfer means when in its said first position coupling said second and third transport means for simultaneous coordinated operation during which substantially equal lengths of the original and black leader films are moved through said cutting station, said third transport means being decoupled from said second transport means when said another transfer means is in its said second position, said cutter means when operated to cut a selected section from the original film simultaneously cutting a substantially equal length section from the black leader film.

4. Apparatus as set forth in claim 3, also including a storage unit located downstream of said cutting station to receive a selected section cut from the original film and a section of substantially equal length cut from the black leader film.

5. Apparatus as set forth in claim 1, also including automatic splicing means for connecting unselected portions of original film end to end to form a composite film.

6. Apparatus as set forth in claim 5, in which the automatic splicing means includes an aligning means to establish sprocket hole spacing prior to application of a splicing tape piece by the splicing means.

7. Apparatus as set forth in claim 1, in which there is a count selector means selectively operable to calibrate the second readout means to produce an output related directly to edge numbers on the original film.

* * * * *